United States Patent [19]
de With et al.

[11] Patent Number: 5,444,490
[45] Date of Patent: Aug. 22, 1995

[54] TELEVISION SYSTEM FOR TRANSMITTING PICTURES IN A DIGITAL FORM

[75] Inventors: Peter H. N. de With; Stephanus J. J. Nijssen; Robert A. Brondijk; Wilhelmus H. A. Bruls, all of Eindhoven, Netherlands

[73] Assignee: U.S. Philips Corporation, New York, N.Y.

[21] Appl. No.: 84,834

[22] Filed: Jun. 29, 1993

[30] Foreign Application Priority Data

Jul. 7, 1992 [EP] European Pat. Off. ............ 92202057

[51] Int. Cl.⁶ ................................................. H04N 7/52
[52] U.S. Cl. ...................................... 348/423; 348/409
[58] Field of Search ................ 358/133, 335; 348/423, 348/405; 341/67; 360/48, 49, 40, 39; H04N 7/137, 7/52

[56] References Cited

U.S. PATENT DOCUMENTS

| | | |
|---|---|---|
| 4,398,217 | 8/1983 | Peters . |
| 4,907,101 | 3/1990 | Keesen et al. . |
| 4,914,515 | 4/1990 | Van Luyt ............................ 348/423 |
| 5,047,852 | 9/1991 | Hanyu et al. ........................ 358/133 |

FOREIGN PATENT DOCUMENTS

0260748 9/1987 European Pat. Off. .
0286184 4/1988 European Pat. Off. .

*Primary Examiner*—Howard W. Britton
*Assistant Examiner*—A. Au
*Attorney, Agent, or Firm*—Michael E. Marion

[57] ABSTRACT

To be able to transmit television pictures in a digital form through a medium having a limited bandwidth, the pictures are subjected to picture transform and to variable-length coding. The picture to be transmitted is converted in this manner into a bit stream comprising code words of variable length. This bit stream is converted into a channel bit stream which is less sensitive to transmission errors. To this end the most significant code words (representing the average luminance and the coarse picture details) of sub-pictures of 8*8 pixels are accommodated at fixed bit positions of the channel bit stream. These code words can be retrieved by simple count-down of the bit positions. The other code words are distributed over the other bit positions. The decoder is relatively simple because the length of each block comprising significant code words is also transmitted. This length is preferably adapted to the extent of picture detail in the sub-picture.

10 Claims, 7 Drawing Sheets

TELEVISION SYSTEM FOR TRANSMITTING PICTURES IN A DIGITAL FORM

FIELD OF THE INVENTION

The invention relates to a television system for transmitting pictures in a digital form. More particularly, the invention relates to a coding station and a decoding station for such a television system. The transmission medium may be the atmosphere, but also a magnetic tape or an optical CD. The invention also relates to a picture signal which represents the transmitted pictures, and to a storage medium on which said picture signal is stored.

DESCRIPTION OF THE PRIOR ART

As is generally known, a television picture is completely defined by three picture signals. These may be the three primary colour signals R, G, B but also, for example a luminance signal Y and two colour difference signals U and V. The visible part of a 625-line TV picture comprises 576 lines with 720 pixels each. If the luminance value of each pixel is represented, for example by an 8-bit code word, approximately $3.10^6$ bits are required for transmitting all luminance values only, which means that there is a bit rate of approximately 75 Mbit/sec in the case of 25 frames per second. Hence, a great deal of research focuses on data reduction of picture signals for the purpose of efficient transmission and storage.

To achieve said object, the series of television pictures is subjected to a coding operation. Many widely different coding operations are possible and in use. An interesting form is transform coding. Each television picture is partitioned into sub-pictures of N*N pixels. A usual value is N=8 so that a picture is partitioned into 6480 sub-pictures. The luminance and colour difference values of each sub-picture are subjected to a forward two-dimensional transform (for example, Discrete Cosine Transform, DCT). Coefficient blocks of 8*8 coefficients are then obtained. The most important coefficient is a measure of the average luminance or colour difference value and is therefore referred to as dc coefficient. The other 63 coefficients describe details of the sub-picture and are referred to as ac coefficients. Their importance generally decreases as the spatial frequency which they represent increases. Such a coefficient block is further subjected to a quantization operation and subsequently to some variable-length coding. Each coefficient block is thus converted into a dam block comprising a series of serial code words of variable length.

A considerable bit rate reduction is realised by means of the variable-length coding. However, the transmission of the data blocks is very sensitive to transmission errors. A transmission error generally results in loss of synchronization at the decoding station. This means that the separate code words are no longer recognized as such.

In order to inhibit loss of synchronization, U.S. Pat. No. 4,907,101 describes a television system in which the variable-length data blocks are formatted in corresponding channel blocks of fixed length. This formatting operation is carried out as follows. Short data blocks which fit in a channel block completely are completely accommodated in this channel block. Such a channel block has a remaining part. Other data blocks have such a length that they do not completely fit in a channel block. In that case selected code words, for example the dc coefficient and the first ac coefficients are accommodated in the corresponding channel block. The excess data are accommodated in the remaining parts of other channel blocks.

The channel blocks are sequentially transmitted in the form of a channel bit stream to a decoding station. Since the channel blocks have a fixed length and thus occur at equidistant instants, a reliable detection of the channel blocks in the decoding station is possible so that transmission errors which may have occurred do not lead to loss of synchronization.

The decoding station of the known television system is adapted to reconstruct the variable-length data blocks from the received channel blocks. To this end the decoding station checks whether a complete data block or a part thereof is accommodated in a received channel block. This data block, or its part, is applied to a first memory. If a complete data block is accommodated in the channel block and if the remaining part of the channel block comprises data of one or more other data blocks, the remaining part is split up and applied to a second memory. Subsequently, both memories are read in such a way that the missing part from the second memory is added to each incomplete data block from the first memory. The reconstructed data blocks are subsequently subjected to operations (variable-length decoding, retransform) which are inverse to the operations performed in the coding station.

For splitting up a channel block into code words of the corresponding data block and the excess code words of one or more other dam blocks, a block separating code is present in the channel bit stream. Such a block separating code, hereinafter referred to as End-Of-Block (EOB) code, is the last code word of a data block and indicates the end of this data block. However, detection of this EOB code requires recognition of at least the length of all code words preceding the EOB code. As described in said U.S. Patent, the decoding station of the known television system therefore comprises two separate decoders. A first decoder receives the channel blocks and is adapted to recognize at least the length of the code words and to detect the EOB code. A second decoder receives the data blocks and is adapted to fully decode all code words.

SUMMARY OF THE INVENTION

It is an object of the invention to provide a television system in which the complexity of the decoding station is simplified considerably.

According to the invention, the coding station is adapted to divide each data block into a main block of a predetermined length comprising selected code words and a sub-block comprising the other code words. At fixed, predetermined bit positions of the channel bit stream a series of one or more main blocks as well as their respective lengths are transmitted. The sub-blocks are distributed over the remaining bit positions.

The split-up, in the decoding station, of the channel bit stream thus obtained into the significant code words and the less significant code words is now achieved by a simple count-down of the length of the series of main blocks. Length decoding of the code words and EOB code detection are no longer necessary. Since said length is accommodated at fixed, predetermined bit positions of the channel bit stream, the reliability of the split-up is not affected by an arbitrary transmission error.

It is to be noted that the non-prepublished Patent Application EP 0 512 623 also proposes to divide a data block into a main block comprising selected code words and a sub-block comprising other code words. The length of the main block is determined by means of a fixed criterion. The main block may comprise, for example all bits of a data block up to a predetermined maximum. Alternatively, it may comprise a fixed number of code words, or as many code words as fit within a fixed length. However, for separating the main block from the channel bit stream, the EOB detection is still necessary, with the attendant length decoding of the previous code words.

It is feasible to transmit the exact length of each main block. However, the coding station is preferably adapted to distinguish data blocks as to their picture energy contents into a limited number of classes, with the length of the main block being represented by the class assigned to the data block. Coding of such a class requires fewer bits than indicating the exact length. Transmitting the length does not even require any extra bits at all if it is represented by a code which is already transmitted for other purposes. More particularly, such a code is formed by a quantization code indicating for each data block how the various DCT coefficients of the data block are quantized. An example has been described in U.S. Pat. No. 4,398,217. Practical tests have proved that said quantization code is sufficiently representative of the picture energy contents of a data block.

The hardware of the transmitter station as well as the decoding station is simplified to a considerable extent if the length of each main block amounts to an integral number of fixed word lengths, for example an integral number of 8-bit words. As far as is necessary, the main blocks are supplemented with dummy bits. The resultant efficiency loss is smaller as a larger number of main blocks is clustered.

DETAILED DESCRIPTION OF PREFERRED EMBODIMENTS

General Structure of the Television System

The invention will be described with reference to a video recorder which is shown diagrammatically in FIG. 1. The video recorder receives an analog picture signal x(t) from a picture signal source 1. This picture signal comprises a luminance signal Y and two colour difference signals U and V, but since all the three signals are subjected to the same operations, only the luminance signal will be considered in this description.

Figure 1:
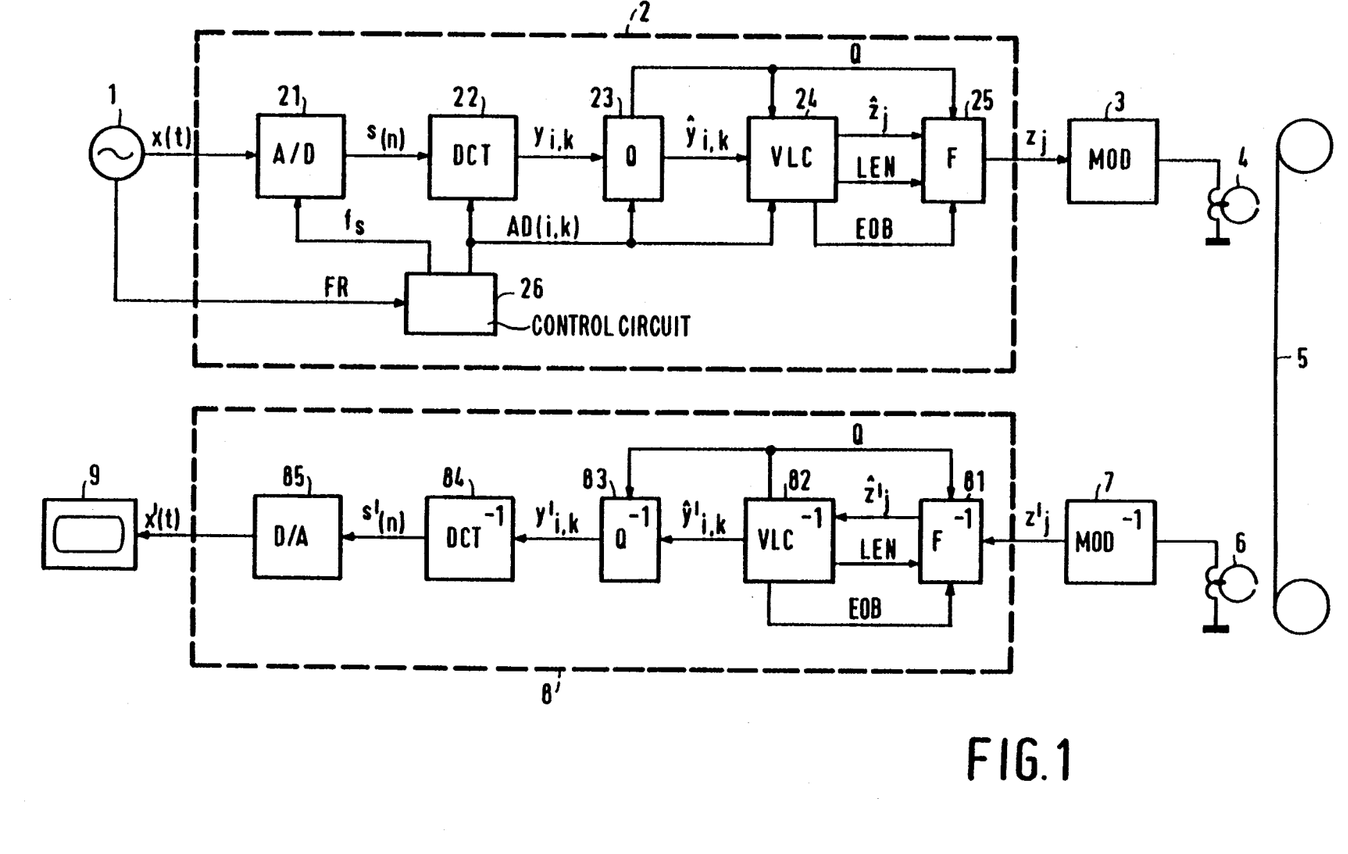
FIG. 1 shows diagrammatically a television system comprising a coding station and a decoding station according to the invention.

The video recorder shown in FIG. 1 comprises a coding station 2 and a decoding station 8. The coding station supplies a serial channel bit stream $z_j$ which is applied via a modulation circuit 3 to a write head 4 by means of which this channel bit stream is recorded on a magnetic tape 5. To regain the original picture signal, a read head 6 is present which converts the information on the magnetic tape into an electric signal which, after demodulation in a demodulation circuit 7, yields a channel bit stream $z'_j$ again which is applied to the input of the decoding station 8. The output of the decoding station supplies an analog picture signal x'(t) which is applied to a monitor 9.

The Coding Station

Figure 2A:
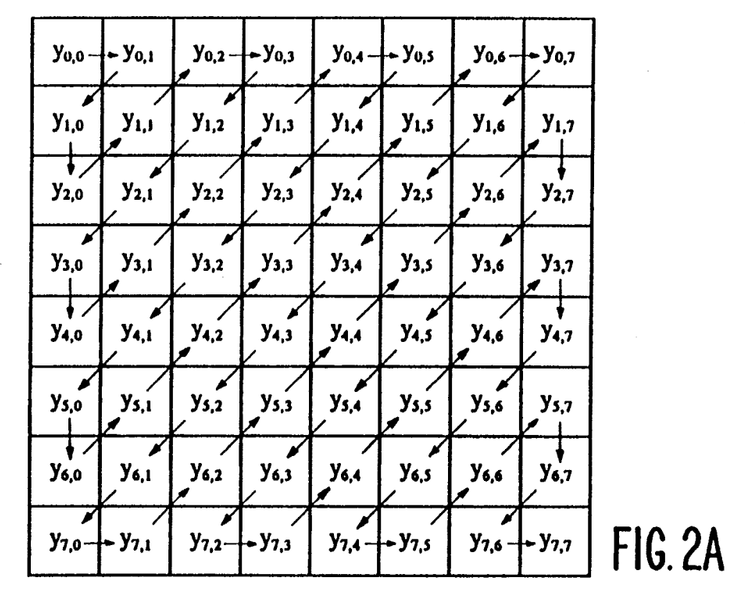
FIGS. 2A-2C show some diagrams to explain the operation of the television system of FIG. 1.

In the coding station 2 the analog picture signal x(t) is sampled in an A/D converter 21 at a suitable sampling frequency $f_s$ of, for example 13.5 MHz. An 8-bit picture signal sample s(n) is obtained for each pixel. These picture signal samples are subsequently applied to a forward two-dimensional Discrete Cosine Transform (DCT) circuit 22. There are numerous literature descriptions of such a circuit, see, for example European Patent Application EP 0 286 184, so that in this context it will be sufficient to remark that this transform circuit supplies the coefficient block shown in FIG. 2A for each sub-picture of 8*8 pixels. The coefficients of such a block are denoted by $y_{i,k}$ in which i,k=0, 1, 2, ..., 7. The coefficient $y_{0,0}$ represents the dc coefficient and is a measure of the average luminance of the sub-picture. The other coefficients $y_{i,k}$ with i,k≠0 are the ac coefficients. The coefficients are consecutively scanned, with the dc coefficient $y_{0,0}$ in the lead. The sequence is denoted in FIG. 2A by means of arrows and is determined by a control circuit 26 which generates address words AD(i,k) for this purpose and applies them to the transform circuit 22.

Figure 2B:
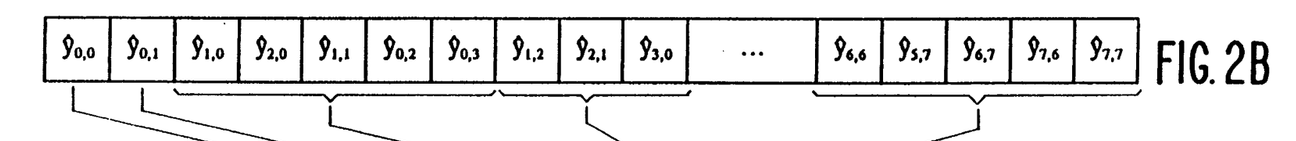

The series of coefficients thus obtained is applied to a quantization circuit 23. This circuit subjects the coefficients $y_{i,k}$ to some quantization operation so that a quantized coefficient $\hat{y}_{i,k}$ is obtained for each coefficient $y_{i,k}$. Generally, the quantization is dependent on the location of the coefficient in the coefficient block. To this end the quantization circuit 23 not only receives the coefficients but also the associated address words AD(i,k). Since many ac coefficients are small, many quantized coefficients $\hat{y}_{i,k}$ will have the value of zero. In this connection it is common practice to refer to them as zero coefficients and non-zero coefficients. The series of quantized coefficients $\hat{y}_{i,k}$ is shown in FIG. 2B.

An increasingly frequent aim is to render the quantization also dependent on the extent to which the sub-picture comprises picture details. The quantity of picture detail is determined by the value of the ac coefficients and the spatial frequencies which they represent. An example of a quantization circuit 23 in which the quantization is dependent on the extent of picture detail is described in U.S. Pat. No. 4,398,217. In this Patent the ac coefficients of a coefficient block are compared with the corresponding coefficients of a number of predetermined reference blocks each representing a picture detail class. The most corresponding reference block defines which picture detail class is assigned to the coefficient block. The ac coefficients of the block are now quantized dependent on the class thus defined. Simpler embodiments of the quantization circuit 23 are also possible. For example, the class may alternatively be formed by a number indicating a range which includes the largest ac coefficient of a block. In practice such a number has been found to be sufficiently representative of the extent of picture detail. The picture detail class is transmitted in the form of a quantization code Q to the decoding station.

The quantized coefficients $\hat{y}_{i,k}$ are subsequently applied to a variable-length (VLC) coding circuit 24 which subjects each coefficient block of 64 quantized coefficients $\hat{y}_{i,k}$ to some variable-length coding strategy and converts them into a series of code words of variable length. The VLC coding circuit also supplies the length LEN for each code word. An embodiment of the VLC coding circuit 24 is described in European Patent Application EP 0 260 748. In this embodiment an unambiguous code word is generated for each non-zero ac coefficient, together with the immediately succeeding or preceding zero coefficients. This strategy is, as it were, a combination of Huffman coding (which for each value of a coefficient yields a code word whose number of bits is dependent on the probability of this value occurring) and run-length coding (in which a code word represents a series of zero coefficients) and has been found to be very favourable in practice. The VLC coding circuit further receives the quantization code Q from the quantization circuit 23 in order that this code is also transmitted as a code word to the decoding station. To be able to distinguish one coefficient block from the other, each coefficient block is terminated with an end-of-block (EOB) code. This EOB code is supplied as soon as the VLC coding circuit receives the last address word AD(7,7) from the control circuit 26. It is to be noted that it is advantageous not to subject the dc coefficient to a variable-length coding but to a fixed length coding. The quantization code Q also has a fixed length.

Figure 2C:
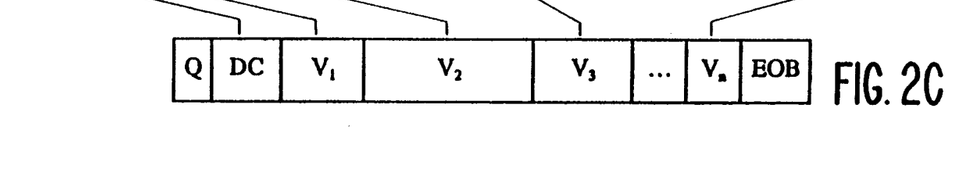

The code words of a coefficient block constitute a data block. In this embodiment it is assumed that the VLC coding circuit 24 supplies the code words bit-serially so that a bit stream $\hat{z}_j$ is obtained. The bit stream corresponding to a data block is shown in FIG. 2C. As is apparent from this Figure, the data block successively comprises: the quantization code Q having a fixed length of, for example 2 bits, the dc coefficient DC having a fixed length of, for example 9 bits, a variable number of variable-length code words $V_1, V_2, \ldots, V_n$ and the end-of-block code EOB having a fixed length of, for example 5 bits. The bit stream $\hat{z}_j$ and the respective length LEN of the code words are applied to the formatting circuit 25 in which they are subjected to a formatting operation.

The Formatting Circuit

Figure 3:
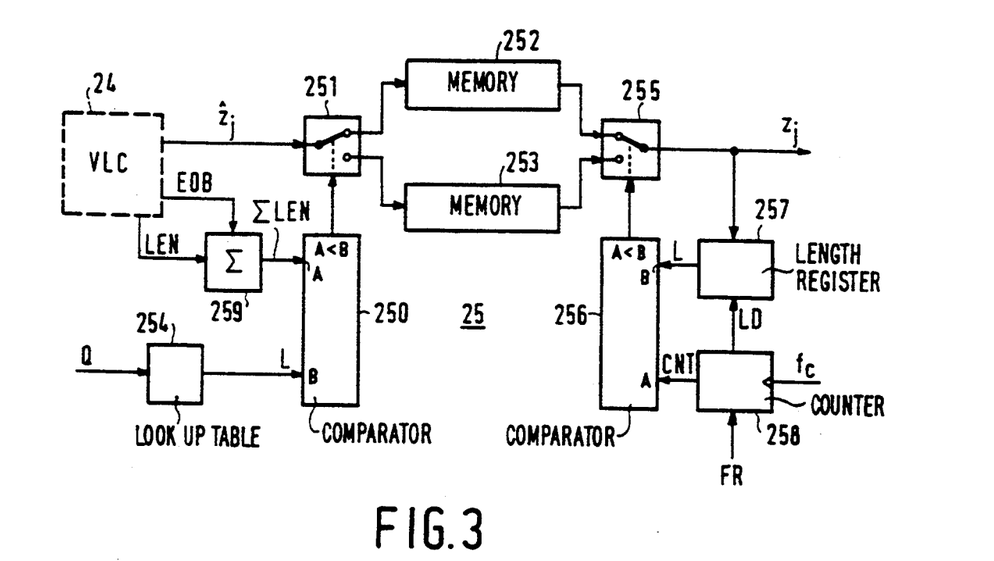
FIG. 3 shows an embodiment of a formatting circuit shown in FIG. 1.

FIG. 3 shows diagrammatically an embodiment of the formatting circuit 25. The supplied bit stream $\hat{z}_j$ is successively subjected to a distributing operation and a multiplex operation.

In the distributing operation the bit stream $\hat{z}_j$ is distributed by means of a distributing switch 251 over a first memory 252 and a second memory 253. Both memories are, for example of the first-in-first-out type. The distributing switch 251 is operated by a comparator 250 which is coupled to an accumulator 259 and to a look-up table 254. The accumulator 259 sums the lengths LEN of the code words and supplies a sum signal ΣLEN. The accumulator is emptied by the occurrence of an end-of-block code EOB which is supplied by the VLC coding circuit 24 (see FIG. 1). The quantization code Q is applied to the look-up table 254. As there is more picture detail in a sub-picture of 8*8 pixels, Q has a larger value. It will be assumed that Q is a 2-bit number in which Q=0 corresponds to the least picture detail and Q=3 corresponds to the most picture detail. A length L is fixed for each value of Q in the look-up table, for example, a length of two bytes for Q=0, four bytes for Q=1, six bytes for Q=2 and eight bytes for Q=3.

The distributing operation is carried out as follows. At the start of each data block the accumulator 259 is emptied. The sum signal ΣLEN then receives the value 0. In this situation the comparator 250 gives the distributing switch 251 the position shown. The first code words of the data block are now written into the first memory 252. The quantization code Q of the data block controls the number of these code words. When the next code word exceeding the length L is received, the distributing switch 251 is given the other position. The relevant code word and the subsequent code words of the data block are then written into the second memory 253. Possible remaining bit positions in the first memory are supplemented by dummy bits until the length L is reached.

Figures 4A, 4B:
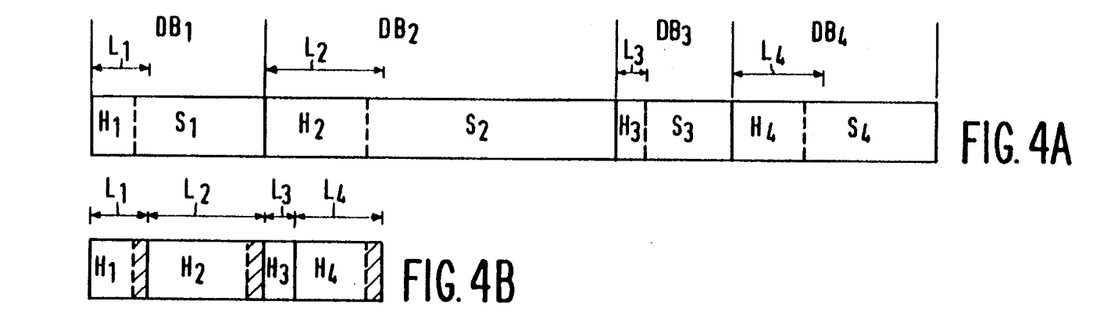
FIGS. 4A-4D show some diagrams to explain the operation of the formatting circuit of FIG. 3.

This distributing operation is further elucidated with reference to FIG. 4. FIG. 4A shows a bit stream $\hat{z}_j$ having four consecutive data blocks $DB_1, \ldots, DB_4$. The quantization code $Q_i$ (not shown) which is indicative of a length $L_i$ is accommodated at fixed bit positions of each data block $DB_i$. The broken lines in FIG. 4A show the boundary between the first code words fitting in the length $L_i$ and the other code words. The first code words are the most significant code words of a data block. More particularly, these are the quantization code, the dc coefficient and the most significant ac coefficients. They represent the average luminance and the coarse details of a sub-picture. This part of the data block is referred to as main block and is denoted by $H_i$ in FIG. 4A. The other code words describe the finer details of a sub-picture and constitute a sub-block $S_i$.

Figure 4C:
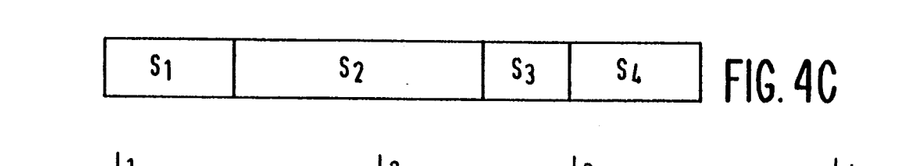

FIG. 4B shows the contents of the first memory 252. It comprises the main block $H_i$ of each data block $DB_i$. As far as the length $L_i$ of the main block is longer than the length of the code words, this length is supplemented by dummy bits. These are shown in the Figure by means of a shaded area. FIG. 4C shows the contents of the second memory 253. It comprises the sub-block $S_i$ of each data block $DB_i$.

After a number of data blocks has been distributed over the two memories in the manner described, a multiplex operation is carried out in which the channel bit stream $z_j$ is formed. To this end the formatting circuit (see FIG. 3) has a multiplex switch 255 with which alternately a complete main block $H_i$ is read from the first memory 252 and a series of bits is read from the second memory 253. The multiplex switch 255 is controlled by the output signal of a comparator 256. Inputs thereof are coupled to a length register 257 and to a modulo-M counter 258.

The modulo-M counter 258 receives a channel clock frequency $f_c$ and a frame reset pulse FR, which pulse is obtained from the picture signal source 1 (see FIG. 1). The counter output CNT is applied to the second input of the comparator 256. The modulo-M counter generates the count CNT=0 each time after M clock pulses of the channel clock frequency $f_c$. At this count the comparator gives the multiplex switch 255 the position shown so that the first memory 252 is read. The channel bit stream $z_j$ now comprises a main block and, more particularly, the quantization code Q which is accommodated therein at a previously known bit position. The length register 257 receives a load signal LD from the modulo-M counter so as to store this quantization code Q. The length register further comprises a look-up table in which the length L of the main block is stored for each Q. This length L is applied to the first input of the comparator 256. As soon as the modulo-M counter 258 reaches the count CNT=L, the relevant main block is fully read and the multiplex switch 255 is given the other position. Subsequently, the bits are read from the second memory 253 until after M clock pulses the count CNT=0 is reached again.

Figure 4D:
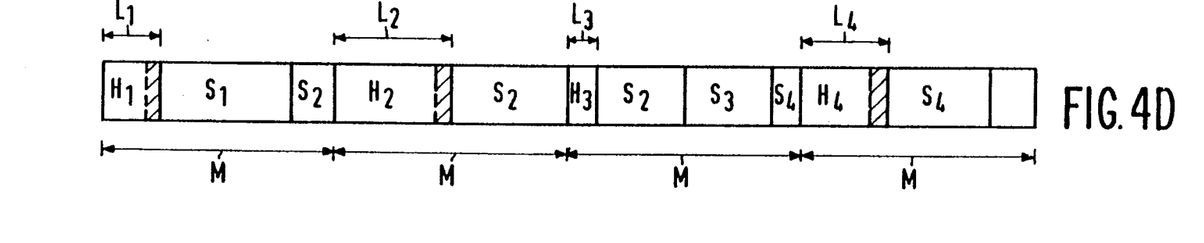

FIG. 4D shows the channel bit stream $z_j$ which is formed in this manner. The channel bit stream comprises M-bit channel blocks in which the main blocks $H_i$ with the significant code words of each data block occur at fixed predetermined instants (in this case even equidistant instants). The sub-blocks are distributed over the remaining bit positions of each channel block.

The Decoding Station

In the decoding station 8 (see FIG. 1) the serial channel bit stream $z'_j$ supplied by the demodulator circuit 7 is applied to a reformatting circuit 81 which successively applies a bit-serial series of dam blocks $\hat{z}'_j$ to a variable-length decoding circuit 82, an inverse quantization circuit 83, an inverse DCT circuit 84 and a D/A converter 85. The deformatting circuit 81 will be described in greater detail. The other circuits are generally known and will not be described.

The Deformatting Circuit

Figure 5:
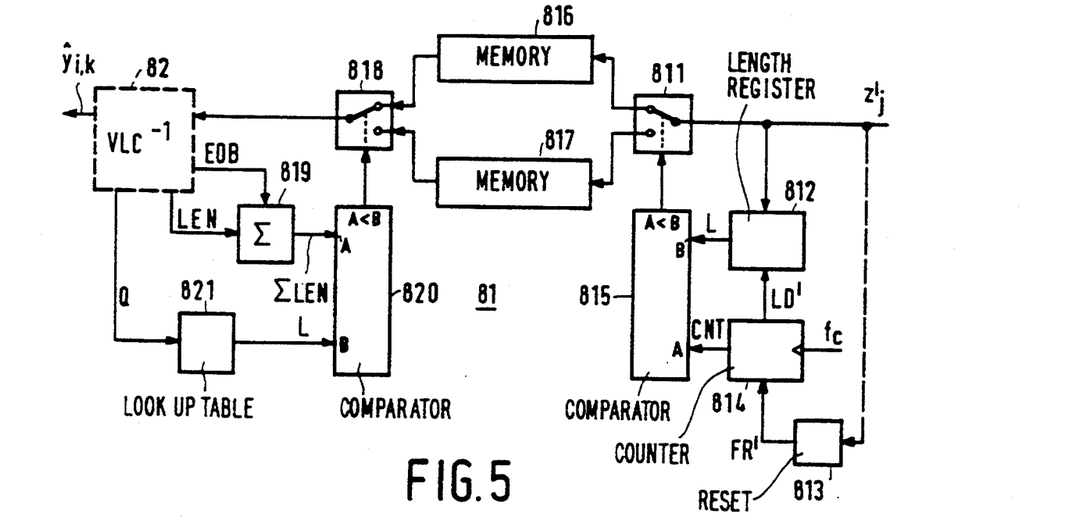
FIG. 5 shows an embodiment of a deformatting circuit shown in FIG. 1.

The deformatting circuit 81 is shown diagrammatically in FIG. 5. Its structure shows great resemblance to that of the formatting circuit which is shown in FIG. 3. The received channel bit stream $z'_j$ is now applied to a distributing switch 811 and a length register 812. A reset circuit 813 generates a reset signal FR' for a modulo-M counter 814 which further receives the channel clock frequency $f_c$. The reset circuit 813 may be implemented in different manners. For example, in the case of a video recorder, it may be coupled to the head drum and supply a pulse at each revolution of this drum. In the case of wireless reception, it may be adapted to detect synchronization words in the channel bit stream.

After having been reset by the reset signal FR', the modulo-M counter 814 supplies a cyclic series of M counts CNT. At a predetermined count, which is indicative of the presence of the quantization code Q in the channel bit stream $z'_j$, the counter applies a load signal LD' to the length register 812. In the manner described hereinbefore, the length register now applies the length L of the currently received main block to a first input of a comparator 815. The count CNT is applied to a second input of this comparator. As long as the count CNT is smaller than the length L, the output signal of the comparator gives the distributing switch 811 the position shown. The code words of each main block are thus applied to a first memory 816. The subsequent code words are applied to a second memory 817 until the count CNT=M is reached.

It is evident from the foregoing that the channel bit stream $z'_j$ (see FIG. 4D) is distributed again into the main blocks $H_i$ (see FIG. 4B) and the sub-blocks $S_i$ (see FIG. 4C). It is an important aspect of the invention that this distributing operation is performed without decoding of variable-length code words being necessary for this operation.

After a number of channel blocks has been stored in the two memories in the manner described, the code words are variable-length decoded. A multiplex switch 818 applies the code words of the first or of the second memory to the variable-length decoding circuit 82 (see also FIG. 1). This circuit recognizes each code word and supplies the quantized coefficients $\hat{y}'_{i,k}$ therefor, as well as the quantization code Q and the end-of-block code EOB. The VLC decoding circuit 82 also supplies the length LEN of each code word. The lengths LEN are summed in an accumulator 819 and applied as a sum signal $\Sigma$LEN to a first input of a comparator 820. Upon detection of an EOB code, the accumulator is emptied and the sum signal $\Sigma$LEN receives the value 0. At the start of each new data block the multiplex switch 818 is thereby given the position shown.

In this manner, code words are first read from the first memory 816 and decoded for each data block. The code word first obtained is the quantization code Q. This code is applied to a look-up table 82 1. The length L corresponding to Q is applied to a second input of the comparator 820. As long as the sum signal $\Sigma$LEN does not exceed the length L, the code words and possible dummy bits are read from the first memory 816 and decoded. These are the dc coefficient and the most significant ac coefficients. As soon as the sum signal $\Sigma$LEN exceeds the length L, the comparator gives the multiplex switch 818 the other position. Now, the code words are read from the second memory 817 and decoded until an EOB code occurs again.

The following may be noted with reference to the properties of the channel bit stream $z_j$ shown in FIG. 4D. Each main block $H_i$ represents the average luminance and the coarse details of a sub-picture. The sub-blocks $S_i$ represent the fine details. The length $L_i$ of each main block $H_i$ is dependent on the quantity of picture details. As a sub-picture has more picture detail, more information is accommodated in a main block so as to transmit this detail to a sufficient extent.

The code words accommodated in a main block are well protected from transmission errors. Generally, a transmission error in a variable-length code word results in both incorrect decoding of the relevant code word and of its length. The subsequent code words are then also misinterpreted so that the synchronization is completely lost. It is not until a "hard" reset signal that the synchronization would be restored. A transmission error could thus mutilate many sub-pictures, even up to a complete picture. However, the channel bit stream shown in FIG. 4D is robust, i.e. it is highly resistant to the consequences of transmission errors. If an error occurs in a main block, only the relevant data block, i.e. the corresponding sub-picture is affected. In fact, the decoding station defines the position of a subsequent main block by a reliable count-down of bits. If an error occurs in a sub-block, a plurality of sub-pictures is affected, but only the fine picture details are affected. The most significant picture information in the form of average luminance and coarser picture details remains faultless.

Further Embodiments

Figure 6:
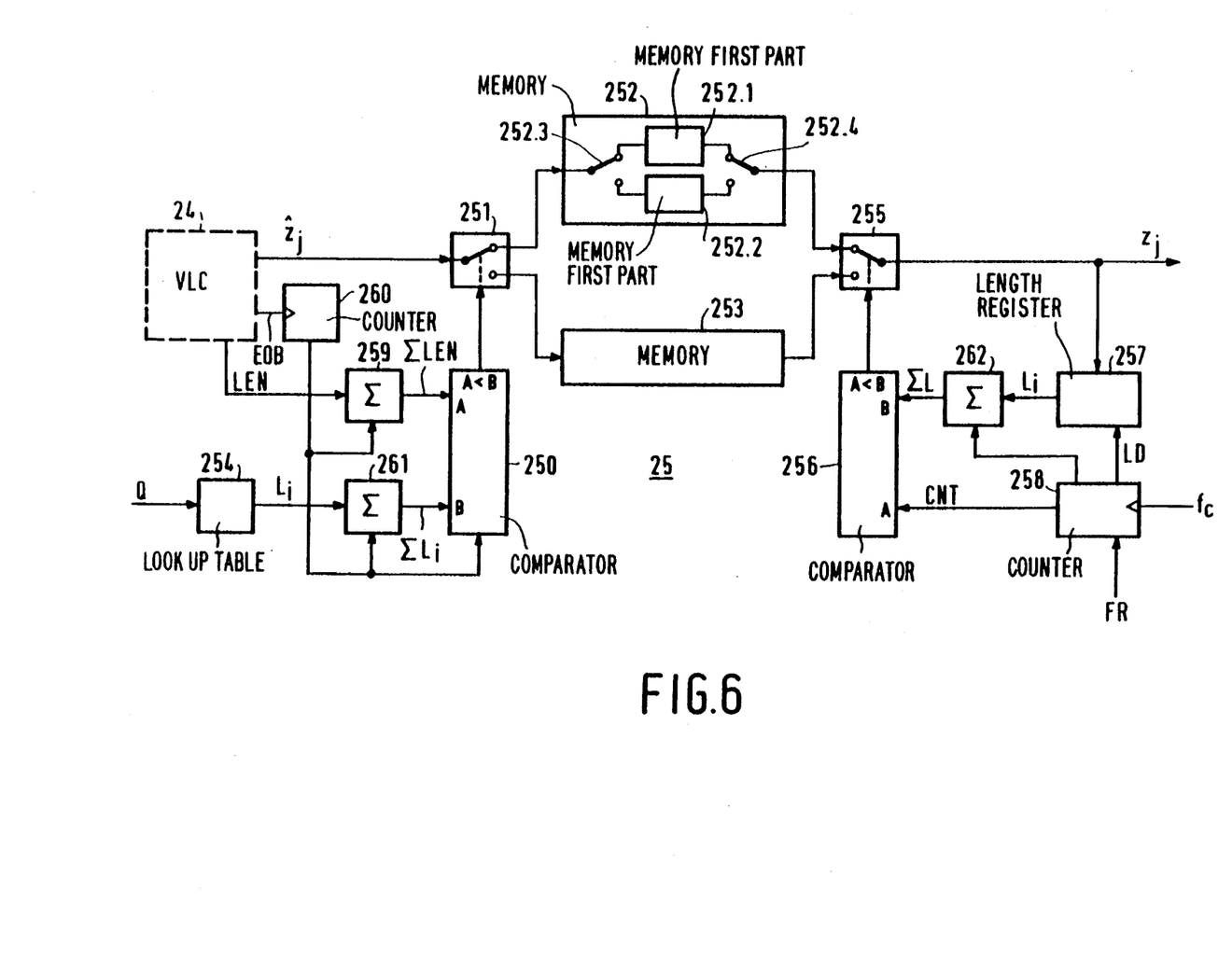
FIG. 6 shows a further embodiment of the formatting circuit shown in FIG. 1.

FIG. 6 shows a further embodiment of the formatting circuit 25 (see FIG. 1). In this Figure identical reference numerals denote the same components as in FIG. 3. The circuit for controlling the distributing switch 251 now comprises a modulo-N counter 260 and a further accumulator 261. The accumulator 261 sums the length $L_i$ of each main block of a predetermined number of data blocks $DB_i$ (i=1, ..., N). The modulo-N counter receives the end-of-block signal EOB as a clock signal and is adapted to empty the accumulators 259 and 261 each time after a series of N data blocks.

The formatting circuit operates as follows. Assuming that the first data block $DB_1$ of a series of N data blocks is applied to the formatting circuit, the two accumulators supply the value 0 to the comparator 250. The distributing switch 251 is then in the position shown and the first code words of the data block are applied to the first memory 252. In contradistinction to FIG. 4, where the codeword exceeding $L_1$ is written in the second memory 253 and where $L_1$ is supplemented with dummy bits, said codeword is now written in the first memory 252. As soon as the sum signal $\Sigma LEN$ has exceeded the length $L_1$, the remaining code words of the data block are applied to the second memory 253. In a corresponding manner, the first code words of the second dam block $DB_2$ are also applied to the first memory 252. The length of each code word written in the first memory 252 is summed in the accumulator 259. In the accumulator 261 the main block length $L_2$ of the second dam block is added to the length $L_1$ of the first data block so that a cumulative main block length $\Sigma L_i$ is obtained. As soon as the sum signal $\Sigma LEN$ has exceeded the cumulative length $\Sigma L_i = L_1 + L_2$, the code words of the second data block are applied to the second memory 253. In this manner a series of N data blocks is divided into main blocks in the first memory 252 and sub-blocks in the memory 253. The main blocks have a total length of $L_1 + L_2 + \ldots + L_N$. Only as far as a code word of the last dam block $DB_N$ no longer fits in said total length, it is supplemented with dummy bits.

Figures 7A, 7B:
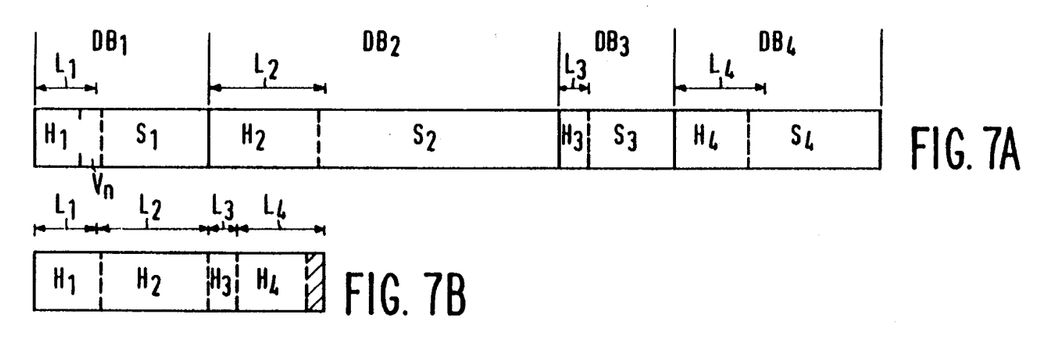
FIGS. 7A-7D show some diagrams to explain the operation of the formatting circuit of FIG. 6.
Figure 7C:
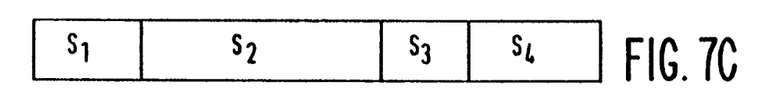

The distributing operation performed by means of this embodiment is described in greater detail in FIG. 7. FIG. 7A shows the same bit stream $\hat{z}_j$ as in FIG. 4A. FIG. 7B shows the contents of the first memory 252. It comprises the code words constituting the main block $H_i$ of each data block $DB_i$. The total length $L_1 + L_2 + \ldots + L_N$ of a series of N (here 4) main blocks is supplemented with dummy bits. These are shaded in the Figure. FIG. 7C shows the contents of the second memory 253. It comprises the other code words forming the sub-block $S_i$ of each data block $DB_i$.

The division, shown in FIG. 6, of the first memory 252 into a first part 252.1, a second part 252.2, a write switch 252.3 and a read switch 252.4 will be further described. The write switch 252.3 receives a switching signal indicated when predetermined fixed length code words are present in the supplied bit stream. This particularly relates to the quantization code Q and, possibly, the dc coefficient DC. With the aid of this switch, the quantization code and possibly the dc coefficient of each main block are stored in the first part 252.1 and the variable-length code words are stored in the second part 252.2.

Subsequently the formatting circuit (FIG. 6) forms the channel bit stream $z_j$. With the aid of the multiplex switch 255 the series of N main blocks $H_1, \ldots, H_N$ is first read from memory 252 and subsequently a series of sub-blocks is read from memory 253. As already described hereinbefore, the multiplex switch 255 is given the shown position for this purpose after modulo-M counter 258 has assumed the count CNT=0. While memory 252 is being read, the read switch 252.4 is in the position shown during a predetermined number of clock pulses. In this way the quantization codes $Q_i$ (and possibly the dc coefficients) of the main blocks are first applied to the output. Since these code words have a fixed length, their instant of occurrence is known. At these instants the modulo-M counter 258 generates the load signal LD with which the quantization codes are stored in the length register 257. The corresponding lengths $L_i$ are summed in an accumulator 262 and the total length $\Sigma L = L_1 + L_2 + \ldots + L_N$ is applied to the comparator 256. As soon as the modulo-M counter 258 reaches the count CNT=$\Sigma L$, the N main blocks are read and the multiplex switch is given the other position. Now, the sub-blocks $S_i$ from memory 253 are applied to the output until the modulo-M counter resumes the count CNT=0. At this count the accumulator 262 is emptied so that a new total length $\Sigma L$ can be determined for the next series of data blocks.

Figure 7D:
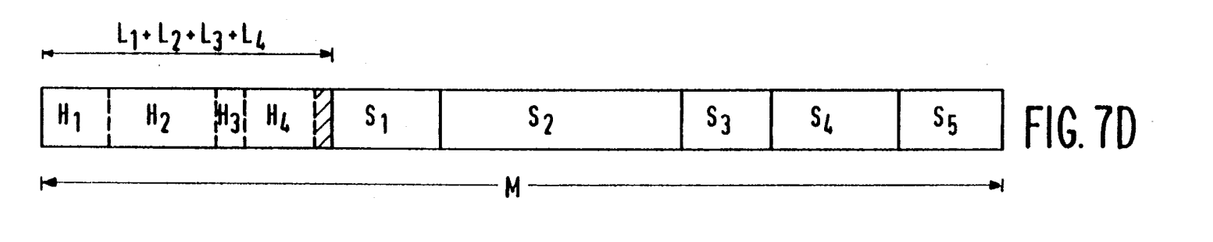

FIG. 7D shows the channel bit stream $z_j$ generated by means of this embodiment. The channel bit stream comprises M-bit channel blocks. Each channel block now comprises a series of N main blocks $H_i$. The sub-blocks are distributed over the remaining bit positions of each channel block.

Figure 8:
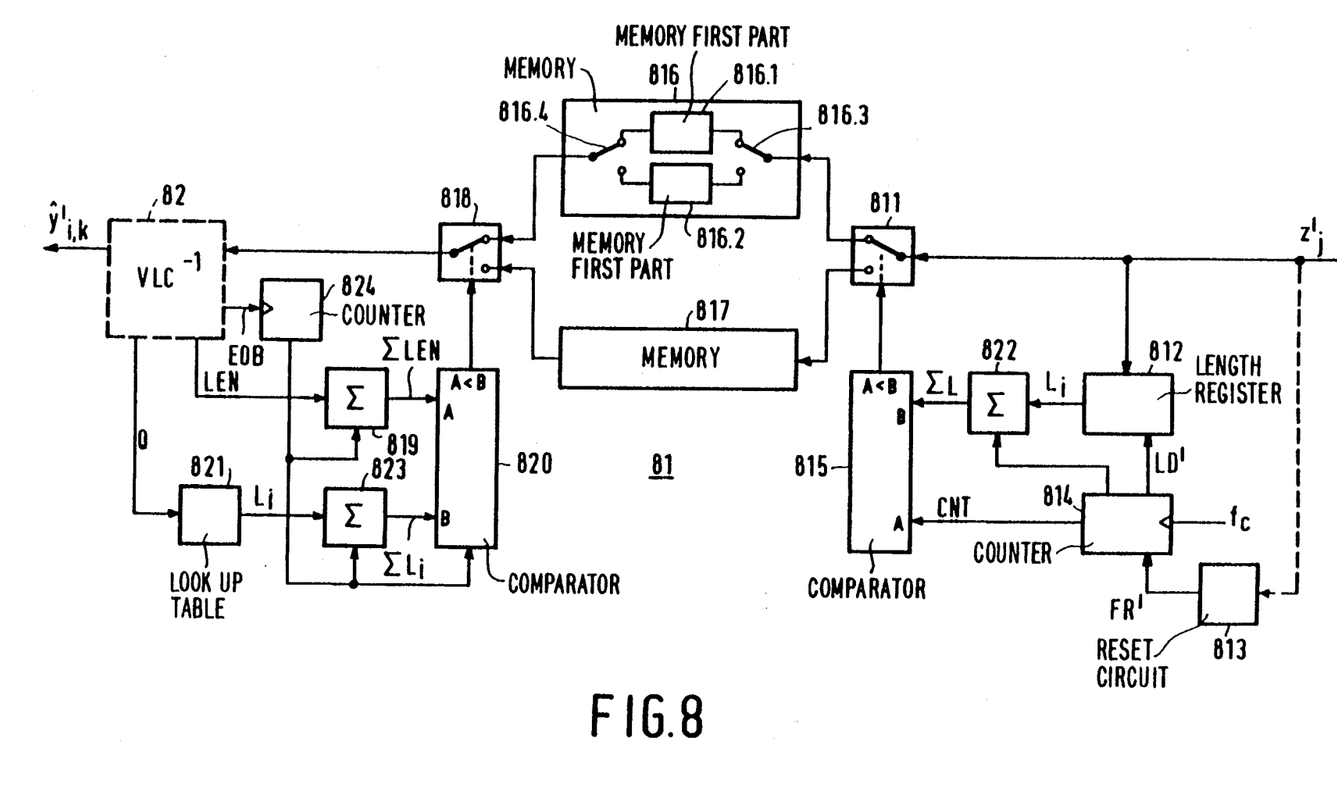
FIG. 8 shows a further embodiment of the deformatting circuit shown in FIG. 1.

FIG. 8 shows the corresponding deformatting circuit 81 (see FIG. 1). In this Figure identical reference numerals denote the same components as in FIG. 5. At the start of a channel block the modulo-M counter 814 assumes the count CNT=0. The distributing switch 811 is thereby given the position shown and the main blocks are applied to the first memory 816. The length register 812 now receives the quantization codes and applies the corresponding lengths $L_i$ to an accumulator 822 which computes the total length $\Sigma L$. As soon as the count reaches the value CNT=$\Sigma L$, the distributing switch 811 is given the other position. The subsequent sub-blocks are applied to the second memory 817 until, after M clock pulses, the count is CNT=0 again. It is again emphasized that no decoding of variable-length code words is necessary for this distributing operation.

It is to be noted that also in the deformatting operation the quantization codes (and possibly the dc coefficients) of each dam block are written in a first part 816.1 of the first memory 816 and the variable-length code words are written in a second part 816.2. This is effected by means of a write switch 816.3 which is controlled at fixed instants.

Subsequently, the code words are variable-length decoded. First, the quantization code and the dc coefficient of each dam block are decoded. To this end, the multiplex switch 818 and a read switch 816.4 are in the position shown. As soon as a quantization code and dc coefficient are read, the read switch 8 16.4 is given the other position in order that the variable-length code words of the main blocks are subsequently decoded. The quantization code Q is applied to the look-up table 821 and the length $L_i$ corresponding to Q is applied to an accumulator 823. The cumulative length $\Sigma L_i$ which is built up in the accumulator 823 is compared in the comparator 820 with the summed length $\Sigma LEN$ of the decoded code words of the main block. Whenever the sum signal $\Sigma LEN$ has exceeded the cumulative length $\Sigma L_i$, the multiplex switch 818 is given the other position. In this position the code words are read from the second memory 817 and decoded until an EOB code occurs which indicates the end of the data block. The EOB codes are counted in a modulo-N counter 824 which empties the accumulators 819 and 823 each time after N dam blocks.

In contrast to FIG. 4D, the main blocks of a number of sub-pictures are located physically close together in FIG. 7D. This is sensible when using various trick modi of video recorders in which a video head only reads parts of a recorded video track. The system may be arranged in such a way that the main blocks are recorded exactly at these parts. A picture display without interference is then obtained.

A further advantage of the channel bit stream shown in FIG. 7D is the increased efficiency as compared with the channel bit stream shown in FIG. 4D, because fewer dummy bits are transmitted. The number of dummy bits is smaller as more main blocks are clustered in a series. In fact, dummy bits are only necessary to render the boundary between main blocks and sub-blocks independent of variable-length words. For example, FIG. 7A shows that the code word $V_n$ of data block $DB_1$ still exceeds the length $L_1$, whereas this is not allowed in FIG. 4A. Only the last code word of a series of data blocks should not exceed the length. To this end, the relevant comparators 252 (FIG. 6) and 820 (FIG. 8) receive a signal from the modulo-N counters 260 and 824, respectively, which signal indicates the last of a series of N data blocks.

It may further be noted that the channel blocks need not necessarily start at equidistant bit positions. For the robustness of the channel bit stream it is sufficient if the bit positions, at which the main blocks and their respective lengths are accommodated, are determined in advance and are known to the decoding station. In practice, different formats can therefore be standardized for consumer recorders and professional recorders. The same applies to the transmission and recording of standard TV signals and HDTV signals.

Finally, it is to be noted that the sub-blocks can also be accommodated in bit series of a predetermined fixed length transmitted at predetermined bit positions. A sub-block is thereby prevented from being located too tar apart from the corresponding main block in the channel bit stream.

We claim:

1. A coding station for coding a picture signal as a digital data stream comprising a series of data blocks with code words of variable length, and for transmitting the digital data stream, the coding station comprising:
    means for dividing each data block into a main block of a variable length comprising selected code words and a sub-block comprising other code words;
    means for transmitting a series of one or more main blocks at first bit positions of the digital data stream, and for transmitting, at second bit positions of the digital data stream, a length code which is indicative of the length of each main block;
    means for distributing the sub-blocks over third bit positions of the digital data stream.

2. A coding station as claimed in claim 1 and further comprising means for categorizing data blocks as to their picture energy contents into classes, the length code of each main block being determined by the class of the data block.

3. A coding station as claimed in claim 1 and further comprising means for transforming pixels in data blocks into spectral coefficients and for quantizing the spectral coefficients, wherein the length code of each main block is formed by a quantization code indicating how the coefficients of the corresponding data block are quantized.

4. A coding station as claimed in claim 1, wherein the series of main blocks has a length equal to an integral number of fixed word lengths.

5. A coding station as claimed in claim 1, wherein the coding station comprises means for adding dummy bits within the series of main blocks whenever the length of the series of main blocks is larger than the length of the code words transmitted therein.

6. A television signal transmitter comprising a coding station as claimed in claim 1.

7. A video recorder comprising a coding station as claimed in claim 1.

8. A coding station as claimed in claim 1 wherein the selected code words in each main block are most significant code words in a corresponding data block and wherein the other code words in each sub-block are least significant code words in said corresponding data block.

9. A decoding station for receiving a picture signal in the form of a digital data stream, the decoding station comprising:
    means for receiving length codes at fixed predetermined positions of the digital data stream;
    means for determining a length for each main block in a series of main blocks from the length codes and for dividing the digital data stream in response to said determined lengths into a first sequence of main blocks of code words and a second sequence of sub-blocks of code words; and
    means for forming a data block by combining a plurality of code words taken from the first sequence and corresponding in number to a length code of a main block with code words taken from the second sequence, said data block being representative of the picture signal.

10. A television signal receiver comprising a decoding station as claimed in claim 9.

* * * * *